US009110865B2

(12) United States Patent
Dow et al.

(10) Patent No.: US 9,110,865 B2
(45) Date of Patent: Aug. 18, 2015

(54) VIRTUAL MACHINE DYNAMIC ROUTING

(75) Inventors: Eli M. Dow, Poughkeepsie, NY (US);
Scott W. Loveland, LaGrange, NY (US); George B. Markos, Wallkill, NY (US)

(73) Assignee: International Business Machines Corporation, Armonk, NY (US)

( * ) Notice: Subject to any disclaimer, the term of this patent is extended or adjusted under 35 U.S.C. 154(b) by 591 days.

(21) Appl. No.: 13/175,144

(22) Filed: Jul. 1, 2011

(65) Prior Publication Data

US 2013/0003531 A1    Jan. 3, 2013

(51) Int. Cl.
| G06F 11/00 | (2006.01) |
| G06F 11/20 | (2006.01) |
| H04L 12/721 | (2013.01) |

(52) U.S. Cl.
CPC ............ *G06F 11/2005* (2013.01); *H04L 45/12* (2013.01)

(58) Field of Classification Search
None
See application file for complete search history.

(56) References Cited

U.S. PATENT DOCUMENTS

| 6,311,288 | B1 * | 10/2001 | Heeren et al. .................. 714/4.2 |
| 7,567,577 | B2 | 7/2009 | Thubert et al. |
| 7,590,051 | B1 * | 9/2009 | Skalecki et al. ............... 370/218 |
| 7,653,836 | B1 | 1/2010 | Chatterjee et al. |
| 2006/0209718 | A1 | 9/2006 | Kinsey et al. |
| 2007/0165596 | A1 | 7/2007 | Boyd et al. |
| 2008/0163207 | A1 * | 7/2008 | Reumann et al. .................. 718/1 |
| 2010/0014526 | A1 * | 1/2010 | Chavan et al. ........... 370/395.53 |
| 2010/0077395 | A1 | 3/2010 | Edwards et al. |
| 2010/0322256 | A1 * | 12/2010 | Riley et al. ..................... 370/400 |
| 2011/0004708 | A1 * | 1/2011 | Kondo et al. ................... 710/38 |
| 2011/0019552 | A1 * | 1/2011 | Karaoguz et al. ............. 370/236 |

OTHER PUBLICATIONS

Vyatta Open Networking [online] [retrieved on Mar. 1, 2011] retrieved from the Internet http://www.vrouter.net/faq/index.php FAQ—Vyatta Virtual Router, Firewall, VPN; Why Virtualize Networking Functionality; 2009.

* cited by examiner

*Primary Examiner* — Steve Young
(74) *Attorney, Agent, or Firm* — Cantor Colburn LLP; Steven Chiu

(57) ABSTRACT

Dynamic network routing in a virtual machine environment. The dynamic network routing includes receiving an indication that a network outage has occurred and receiving a network communication to a guest or from the guest executing on a hypervisor. It is then determined if the guest that is the source or destination for the network communication is configured to use a revised network route. In response to determining that the guest is not configured to use the revised network route, then the transmission of the network communication is prevented and the guest is provided with network routing information. Once the guest has received the updating routing information the transmission of the network communication on the new route is allowed.

18 Claims, 3 Drawing Sheets

VIRTUAL MACHINE DYNAMIC ROUTING

BACKGROUND

This invention relates generally to processing within a computing environment, and more particularly to dynamic routing in a virtual machine environment.

In a network environment, proper and flexible routing of network packets is crucial. In order to increase throughput and/or reliability, servers are often configured with two or more network interface cards (NICs). Often one is used for primary network traffic, and a second is used as a backup in case the first one loses network connectivity. In order to properly route network packets to the correct network card, and therefore dynamically adjust the network path (or routes) based on the network's conditions, operating systems are configured to use dynamic routing protocols that dynamically detect changes in the routed networking infrastructure. In order for the operating system to dynamically adjust to these changes, it must use some computer processing resources.

Although the processing resources used to update network routes is typically small, in a virtual machine environment, a number of operating systems may execute on a single server simultaneously. Each of the operating systems must consume computer processing resources every time any of the routes are updated. This generally happens simultaneously, and therefore, with enough virtual machines executing on a single server, a network change may trigger a larger collective use of processing resources in order to update the revised routes across all of the virtual machines residing on the single server.

BRIEF SUMMARY

An embodiment includes a computer implemented method for dynamic virtual routing. The method includes receiving, on a computer, an indication that a network outage has occurred. The method additionally includes receiving a network communication to a guest or from the guest executing on a hypervisor. It is then determined if the guest that is the source or destination for the network communication is configured to use a revised network route. In response to determining that the guest is not configured to use the revised network route, then the transmission of the network communication is prevented and the guest is provided with network routing information. Once the guest has received the updating routing information the transmission of the network communication on the new route is allowed.

Another embodiment includes a system, the system includes a computer processor configured to execute a dynamic routing concentrator module. The dynamic routing concentrator module is configured to perform a method. The method includes receiving an indication that a network outage has occurred. The method additionally includes receiving a network communication to a guest or from the guest executing on a hypervisor. It is then determined if the guest that is the source or destination for the network communication is configured to use a revised network route. In response to determining that the guest is not configured to use the revised network route, then the transmission of the network communication is prevented and the guest is provided with network routing information. Once the guest has received the updating routing information the transmission of the network communication on the new route is allowed.

A further embodiment includes a computer program product. The computer program product includes a tangible storage medium readable by a processing circuit that store instructions for execution by the processing circuit which performs a method. The method includes receiving an indication that a network outage has occurred. The method additionally includes receiving a network communication to a guest or from the guest executing on a hypervisor. It is then determined if the guest that is the source or destination for the network communication is configured to use a revised network route. In response to determining that the guest is not configured to use the revised network route, then the transmission of the network communication is prevented and the guest is provided with network routing information. Once the guest has received the updating routing information the transmission of the network communication on the new route is allowed.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Figure 1:
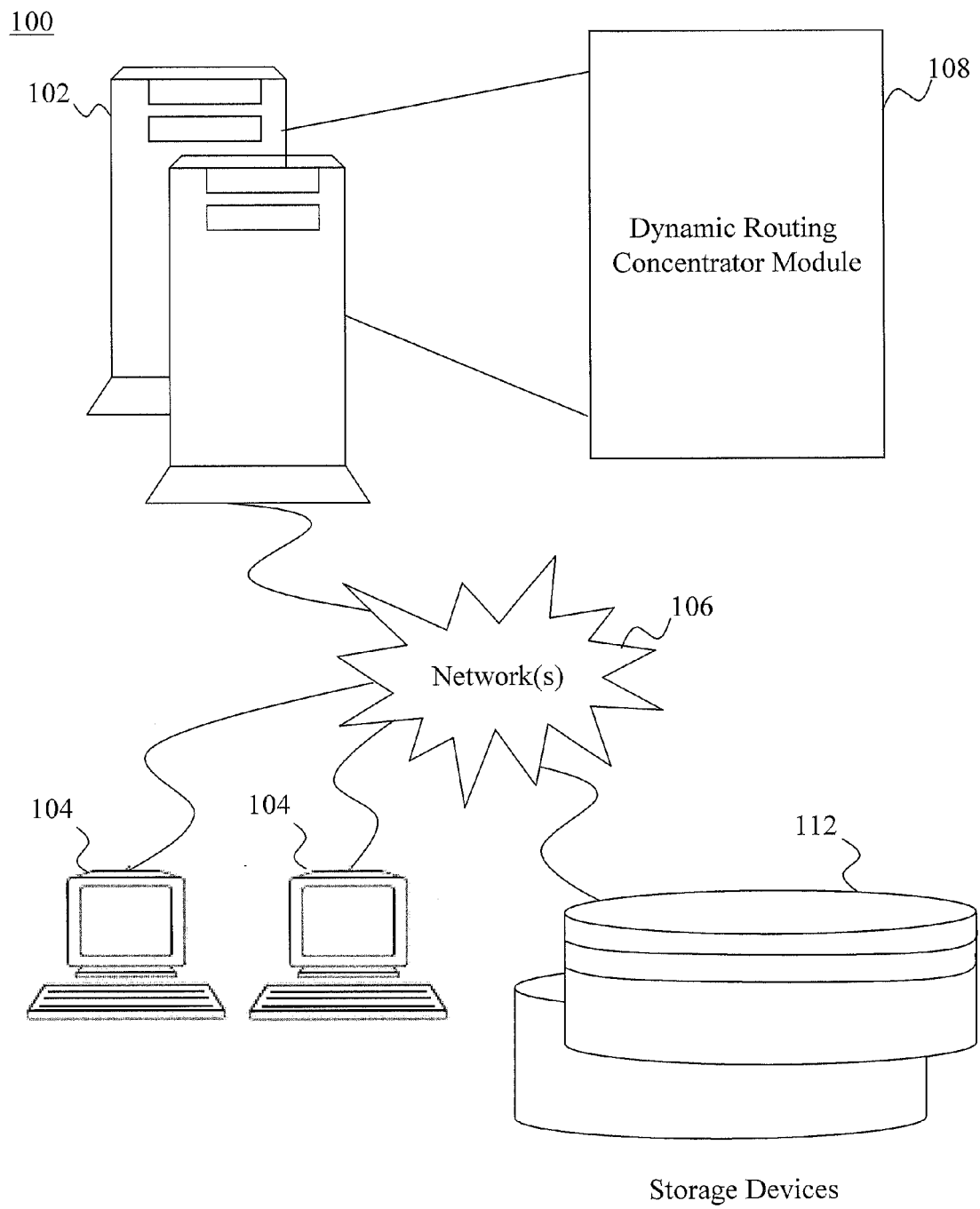
FIG. 1 depicts a schematic diagram of a system for dynamic routing concentration in a virtual machine environment that may be implemented in an embodiment.

An embodiment of the present invention provides for centralized dynamic routing in a virtual machine environment. A dynamic routing concentrator is provided, which centralizes the management of generating and managing routes at runtime. The dynamic routing concentrator intercepts messages from the network devices, such as a network interface card, that indicate that a device or section of a network is down, and provides just-in-time notification to one or more virtual machines that it manages. When the dynamic routing concentrator receives a message that a network device, or network segment is unavailable, it automatically provides any information necessary for the network to re-reroute connections to each of the virtual machines under its control, and then manages a table of the virtual machines that need the updated routing information. The new routing information is not transmitted to the virtual machines immediately. The routing information is maintained until either the virtual machine attempts to make a network transmission, or the hypervisor receives a network transmission that is directed to one of its virtual machines. At that time, the hypervisor transmits the new routing information to the virtual machine, which in turn updates its internal routing information, and then continues with the transmission or receipt of the message. This process continues until all of the virtual machines are updated or shut down.

Ordinarily operating systems, whether executing on virtual or physical machines, manage their own routing. When one part of a network, or network device is down, either for because of a problem, or a planned outage, the dynamic routing process running on the operating system receives a notification, or an error message indicating an issue, and then updates its internal routing tables in order to bypass the issue. The operating system must use processing resources in order to make the correction. The use of these resources is magnified in a virtual environment where often a number of operating systems are simultaneously executing dynamic routing processes on a single physical machine. When a network or device shared by a plurality of virtual machines goes down, each and every dynamic routing process must simultaneously adjust its respective routing table. The extra load generated by all of the routing processes updating their routes dynamically may lead to delayed routing changes, system freezes as a result of resource contentions between the network routing changes and the applications executing on the system, and/or performance lags and unwanted spikes in system computer processor resource consumption.

In an embodiment, a new type of dynamic routing concentrator operating at the hypervisor and or an intelligent network card is used to reduce the impact of dynamic routing by each of the guest operating systems (or guests) on the server. This is accomplished through the use of a lazy routing injection through a delayed interrupt. For example, the next time the guest uses the network interface (I/O) the new routes are passed to the guest and are applied at that time. This prevents the need to "wake up" multiple guests just to update their respective routing tables. It also mitigates a storm condition where a large number of guests need new routes because of one major fault somewhere in the network. These updates are instead handled individually which amortizes the computational cost of all of the updates. In an embodiment, the hypervisor injects updated routes to the guests while the hypervisor performs routine activities, such as when the hypervisor determines if the guest has anything to run. In an additional embodiment, the updated routes are only injected into the guest if the system is under a configurable threshold.

Turning now to FIG. 1, a system 100 for implementing dynamic routing concentration in a virtual machine environment will now be described. In an exemplary embodiment, the system 100 includes a host system computer 102 executing computer instructions for dynamic routing concentration in a virtual machine environment. Host system computer 102 may operate in any type of environment that is capable of executing a software application. Host system computer 102 may comprise a high-speed computer processing device, such as a mainframe computer, to manage the volume of operations governed by an entity for which the dynamic virtual machine domain configuration and virtual machine relocation management is executing. In an exemplary embodiment, the host system computer 102 is part of an enterprise (e.g., a commercial business) that implements the dynamic virtual machine domain configuration and virtual machine relocation management.

In an exemplary embodiment, the system 100 depicted in FIG. 1 includes one or more client systems 104 through which users at one or more geographic locations may contact the host system computer 102. The client systems 104 are coupled to the host system computer 102 via one or more networks 106. Each client system 104 may be implemented using a general-purpose computer executing a computer program for carrying out the processes described herein. The client systems 104 may be personal computers (e.g., a lap top, a personal digital assistant, a mobile device) or host attached terminals. If the client systems 104 are personal computers, the processing described herein may be shared by a client system 104 and the host system computer 102 (e.g., by providing an applet to the client system 104). Client systems 104 may be operated by authorized users (e.g., programmers) of the dynamic routing concentration in a virtual machine environment as described herein.

The networks 106 may be any type of known network including, but not limited to, a wide area network (WAN), a local area network (LAN), a global network (e.g., Internet), a virtual private network (VPN), and an intranet. The networks 106 may be implemented using a wireless network or any kind of physical network implementation known in the art. A client system 104 may be coupled to the host system computer 102 through multiple networks (e.g., intranet and Internet) so that not all client systems 104 are coupled to the host system computer 102 through the same network. The host system computer 102 is connected to the network 106 via one or more network adapters. One or more of the client systems 104 and the host system computer 102 may be connected to the networks 106 in a wireless fashion. In one exemplary embodiment, the networks 106 include an intranet and one or more client systems 104 executing a user interface application (e.g., a web browser) to contact the host system computer 102 through the networks 106. In another exemplary embodiment, the client system 104 is connected directly (i.e., not through the networks 106) to the host system computer 102 and the host system computer 102 contains memory for storing data in support of dynamic routing concentration in a virtual machine environment. Alternatively, a separate storage device (e.g., storage device 112) may be implemented for this purpose.

In an exemplary embodiment, the storage device 112 includes a data repository with data relating to dynamic routing concentration in a virtual machine environment by the system 100, as well as other data/information desired by the entity representing the host system computer 102 of FIG. 1. The storage device 112 is logically addressable as a consolidated data source across a distributed environment that includes networks 106. Information stored in the storage device 112 may be retrieved and manipulated via the host system computer 102 and/or the client systems 104. In an embodiment, the storage device 112 includes one or more databases containing, e.g., dynamic routing concentration in a virtual machine environment data and corresponding configuration parameters, values, methods, and properties, as well as other related information as will be discussed more fully below. It will be understood by those of ordinary skill in the art that the storage device 112 may also comprise other structures, such as an XML file on the file system or distributed over a network (e.g., one of networks 106), or from a data stream from another server located on a network 106. In an additional embodiment, all or a portion of the storage device 112 may alternatively be located on a client system 104.

The host system computer 102 depicted in the system of FIG. 1 may be implemented using one or more servers operating in response to a computer program stored in a storage medium accessible by the server. The host system computer 102 may operate as a network server (e.g., a web server) to communicate with the client systems 104. The host system computer 102 handles sending and receiving information to and from the client systems 104 and can perform associated tasks. The host system computer 102 may also include a firewall to prevent unauthorized access to the host system computer 102 and enforce any limitations on authorized access. For instance, an administrator may have access to the entire system and have authority to modify portions of the system. A firewall may be implemented using conventional hardware and/or software as is known in the art.

The host system computer 102 may also operate as an application server. The host system computer 102 executes one or more computer programs to provide dynamic routing concentration in a virtual machine environment. The host system computer 102 includes a dynamic routing concentrator module 108 for managing dynamic routing concentration in an embodiment. As indicated above, processing may be shared by the client systems 104 and the host system computer 102 by providing an application (e.g., java applet) to the client systems 104. Alternatively, the client system 104 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

It will be understood that the dynamic routing concentration in a virtual machine environment described in FIG. 1 may be implemented in hardware, software, or a combination thereof.

Figure 2:
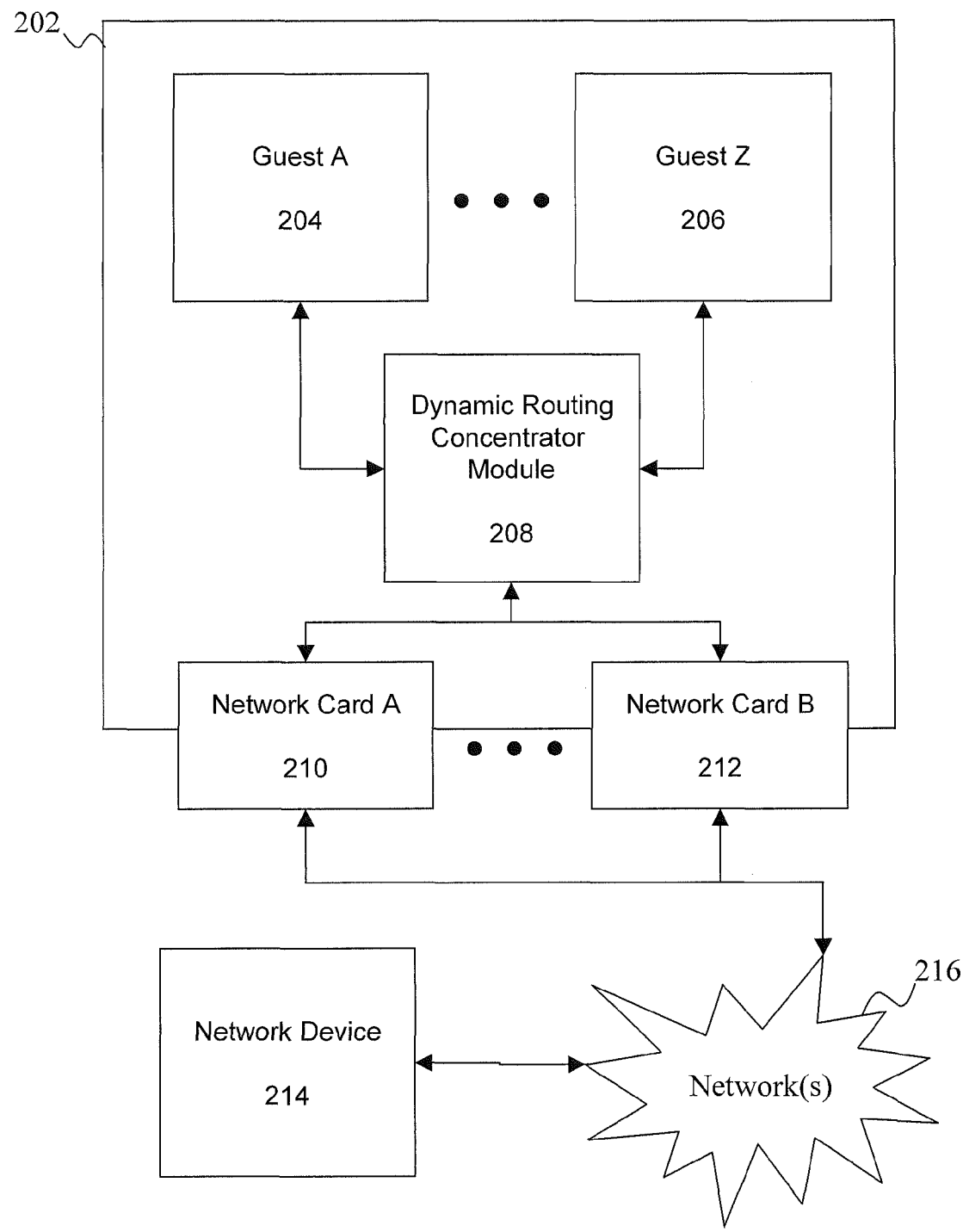
FIG. 2 depicts a schematic diagram of a detailed view of a system for implementing dynamic routing concentration in a virtual machine environment in an embodiment.

FIG. 2 is a schematic diagram of a system for implementing dynamic routing concentration in a virtual machine environment in an embodiment. FIG. 2 includes a hypervisor 202. The hypervisor 202 includes one or more guests such as guest A 204 and guest Z 206. Each of the one or more guests is connected to a network 216 through a dynamic routing concentrator module 208. In an embodiment, the dynamic routing concentrator is executing in the hypervisor 202. In an alternate embodiment, the dynamic routing concentrator module 208 is executing in one or more network cards, such as network card A 210, and/or network card B 212. In additional embodiments, the dynamic routing concentrator module 208 may be implemented in hardware either built into a network card, or external to the network card.

In an embodiment, the dynamic routing concentrator module 208 is in communication with the network 216 via two or more network cards such as network card A 210 and network card B 212. In an embodiment, network card A 210 serves as the primary network card, while network card B 212 serves as a backup card. In an embodiment, one or more of the of the two or more network cards is a different model card and/or lower quality card than the other network cards. The two or more network cards are connected to a network device 214 over the network 216. The network device 214 may be any network device 214 as is known in the art (e.g., a router, switch, server, hub, storage, etc.). In an embodiment, each of the two or more network cards is connect to different network device 214.

Figure 3:
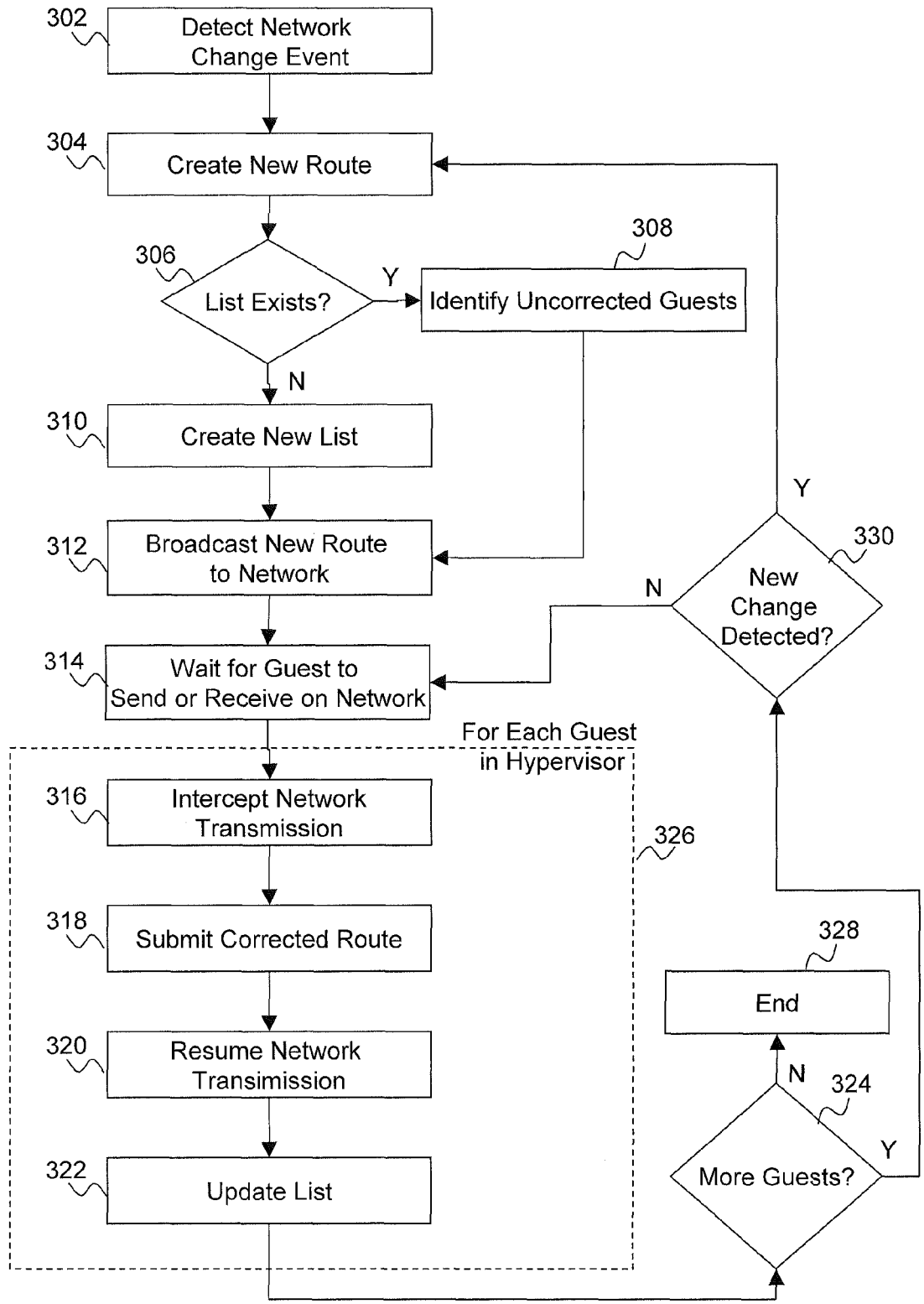
FIG. 3 depicts a process flow for dynamic routing concentration in a virtual machine environment that may be implemented in an embodiment

FIG. 3 is a process flow for dynamic routing concentration in a virtual machine environment that may be implemented in an embodiment. In an embodiment, the process flow of FIG. 3 is executed in a dynamic routing concentrator module such as the dynamic routing concentrator module 208 of FIG. 2. At block 302, a network change event is detected. The network change event may be a network card or circuit that has gone offline, been brought online, and/or any other event that impacts network connectivity (e.g. a network link that has too much data, a network segment that is operating slower than expected tolerances, a missing acknowledgement of receipt, etc.). At block 304, a new network route is generated based on the network change. For example, if a network card becomes disabled, the route entry using the respective network card is removed from the active routing table. At block 306, it is determined if a list of guests controlled by the hypervisor and in need of a route update already exists due to a previous event, such as, for example, when a network link goes down and then comes back up again. If there is no entry in the routing table, then at block 310 a new list is created for all of the guests controlled by the hypervisor. At block 312, the new route is broadcast over the network by the hypervisor in order to allow the network to be aware of the change to the network (i.e., where to route traffic going forward.)

At block 314, the system waits until it either receives a packet over the network that is directed to a guest that has not yet been updated, which is determined by whether or not the guest is on the list of guests that need to be updated, or one of those guests initiates a network transmission. At that point, the recurring blocks 326 are executed for each guest that is still on the list. At block 316, the network transmission is intercepted before it is forwarded onto the network and/or sent to the guest. At block 318, the previously calculated route is sent to the guest and the guest updates its internal routing table accordingly. In an embodiment, the guest is notified of the network change and calculates the new route on its own. At block 320, the original network transmission is allowed to complete. At block 322, the list of guests that need to be given updated routes is updated to show that the current guest has been updated. At block 324, if there are more guests that need to be updated on the list, then processing continues at block 326. At block 330, it is determined if any new changes to the network have been received. If there have been new updates to the network, then processing continues at block 304, otherwise processing continues at block 314.

Returning to block 324, if there are no more guests that need to be updated on the list then processing ends at block 328. Returning to block 306, if a list already exists, then at block 308 logic is used to determine which guests need to be updated. If the network has returned to the previous state (i.e., the state prior to the last change, such as when the network card has come back online), then those guests on the list (i.e., the ones that have not yet been updated) are removed from the list and all other guests are added to the list. If, however, the network change is a new state different from the previous state, then a new list is created that includes all of the guests. When the list has been updated, processing continues at block 312.

Technical effects and benefits include a centralized dynamic routing concentrator that allows updates of new routing information to the guests of a hypervisor only when the guests need to use the modified network, thereby amortizing the computational expense incurred by requiring all of the guests to update their routes simultaneously.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or schematic diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for updating a plurality of guests of a hypervisor with network routing information in accordance with a modified network, comprising:
receiving, on a computer, an indication of a network change event, the network change event being with respect to a first route;
receiving, on the computer, a network communication to a guest of the plurality of guests executing on the hypervisor or from the guest;
based on receiving the indication and the network communication, determining, on the computer, whether each of the plurality of guests has been provided with the network routing information subsequent to the receiving the indication, the network routing information identifying the network change event;
storing in a list as a subset each of the plurality of guests that has not received the network routing information;
responsive to determining that the guest has not been provided with the network routing information subsequent to the receiving the indication:
preventing a network transmission by the guest;
causing the guest to calculate a second route by providing the guest with the network routing information, wherein the second route is calculated by the guest responsive to the network routing information, wherein the second route is a modified version of the first route that utilizes the network routing information to create the modified network; and
allowing the network transmission on the second route responsive to the providing;
receiving a second indication that the network change event has cleared; and
removing from the list the subset of the plurality of guests.

2. The computer implemented method of claim 1, wherein the second route calculated responsive to the network change event.

3. The computer implemented method of claim 1, wherein of the plurality of guests is provided with the network routing information responsive to one of:
the network communication is sent from the guest;
the network communication is sent to the guest; and
a normal scheduled wakeup event.

4. The computer implemented method of claim 3, wherein each of the plurality of guests is removed from the list as each of the plurality of guests is provided the network routing information.

5. The computer implemented method of claim 4, further comprising:
adding to the list all of the plurality of guests that are not in the subset of the plurality of guests as a remaining plurality of guests;
calculating a third route; and
for each remaining plurality of guests on the list, performing:
receiving a new network communication to that guest or from that guest executing on the hypervisor; and
responsive to determining that that guest is not configured to use the third route:
preventing a second network transmission by that guest;
providing that guest with the third route; and
allowing the second network transmission on the third route responsive to the providing.

6. The computer implemented method of claim 1, wherein the guest is provided with the network routing information responsive to one of:
the network communication is sent from the guest; and
the network communication is sent to the guest.

7. The computer implemented method of claim 1, where amortizing a computational expense incurred by the computer by causing of the guest to calculate the second route by providing updates to the network routing information when the guests need to use a modified network that includes the second route.

8. The computer implemented method of claim 1, wherein the hypervisor executes a plurality of guests that includes the guest, each of the plurality of guests being provided with the network routing information responsive to receiving a network communication to or from that guest to cause that guest to calculate the second route.

9. A system comprising:
a computer processor configured to execute a dynamic routing concentrator module for updating a plurality of guests of a hypervisor with network routing information in accordance with a modified network, the dynamic routing concentrator module performing:
receiving an indication of a network change event, the network change event being with respect to a first route;
receiving a network communication to a guest of the plurality of guests executing on the hypervisor or from the guest;
based on receiving the indication and the network communication, determining whether each of the plurality of guests has been provided with the network routing information subsequent to the receiving the indication, the network routing information identifying the network change event;
storing in a list as a subset each of the plurality of guests that has not received the network routing information;
responsive to determining that the guest has not been provided with the network routing information subsequent to the receiving the indication:
preventing a network transmission by the guest;
causing the guest to calculate a second route by providing the guest with the network routing information, wherein the second route is calculated by the guest responsive to the network routing information, wherein the second route is a modified version of the first route that utilizes the network routing information to create the modified network; and
allowing the network transmission on the second route responsive to the providing; receiving a second indication that the network change event has cleared; and
removing from the list the subset of the plurality of guests.

10. The system of claim 9, wherein the second route calculated responsive to the network change event.

11. The system of claim 9, wherein each of the plurality of guests is provided with the network routing information responsive to one of:

the network communication is sent from the guest;
the network communication is sent to the guest; and
a normal scheduled wakeup event.

12. The system of claim 11, wherein each of the plurality of guests is removed from the list as each of the plurality of guests is provided the network routing information.

13. The system of claim 12, wherein the dynamic routing concentrator module further performs:
adding to the list all of the plurality of guests that are not in the subset of the plurality of guests as a remaining plurality of guests;
calculating a third route; and
for each remaining plurality of guests on the list, performing:
receiving a new network communication to that guest or from that guest executing on the hypervisor; and
responsive to determining that that guest is not configured to use the third route:
preventing a second network transmission;
providing that guest with the third route; and
allowing the second network transmission on the third route responsive to the providing.

14. The system of claim 9, wherein the guest is provided with the network routing information responsive to one of:
the network communication is sent from the guest;
the network communication is sent to the guest; and
a normal scheduled wakeup event.

15. A computer program product comprising:
a tangible storage medium readable by a processing circuit and storing instructions for execution by the processing circuit for performing a method for updating a plurality of guests of a hypervisor with network routing information in accordance with a modified network, the instruction causing the processor to perform operation comprising:
receiving an indication of a network change event, the network change event being with respect to a first route;
receiving a network communication to a guest of the plurality of guests executing on the hypervisor or from the guest;
based on receiving the indication and the network communication, determining whether each of the plurality of guests has been provided with the network routing information subsequent to the receiving the indication, the network routing information identifying the network change event;
storing in a list as a subset each of the plurality of guests that has not received the network routing information;
responsive to determining that the guest has not been provided with the network routing information subsequent to the receiving the indication:
preventing a network transmission by the guest;
causing the guest to calculate a second route by providing the guest with the network routing information, wherein the second route is calculated by the guest responsive to the network routing information, wherein the second route is a modified version of the first route that utilizes the network routing information to create the modified network; and
allowing the network transmission on the second route responsive to the providing;
receiving a second indication that the network change event has cleared; and
removing from the list the subset of the plurality of guests.

16. The computer program product of claim 15, wherein the second route calculated responsive to the network change event.

17. The computer program product of claim 15, wherein each of the plurality of guests is provided with the network routing information responsive to one of:
the network communication is sent from the guest; and
the network communication is sent to the guest.

18. The computer program product of claim 17, wherein each of the plurality of guests is removed from the list as each of the plurality of guests is provided the network routing information.

* * * * *